United States Patent [19]

Nakane et al.

[11] 4,231,456
[45] Nov. 4, 1980

[54] CLUTCH RELEASING DEVICE

[75] Inventors: Mototaka Nakane, Toyota; Hideichi Hori, Tokai, both of Japan

[73] Assignee: Aisin Seiki Kabushiki Kaisha, Kariya, Japan

[21] Appl. No.: 31,734

[22] Filed: Apr. 20, 1979

[30] Foreign Application Priority Data

Apr. 28, 1978 [JP] Japan .................................. 53-51618

[51] Int. Cl.³ .............................................. F16D 13/75
[52] U.S. Cl. .............................. 192/70.25; 192/70.28; 192/111 A
[58] Field of Search ......... 188/72.3, 79.5 R, 79.5 GE, 188/216; 192/70.25, 70.28, 89 B, 98, 111 R, 111 A

[56] References Cited

U.S. PATENT DOCUMENTS

| | | | |
|---|---|---|---|
| 3,700,084 | 10/1972 | Nasu et al. | 192/70.28 |
| 3,702,651 | 11/1972 | Fujita et al. | 192/111 A |
| 3,773,155 | 11/1973 | Fujita et al. | 192/70.25 |
| 3,822,772 | 7/1974 | Murakami | 192/111 A |
| 3,933,230 | 1/1976 | Adachi | 192/111 A |
| 4,141,441 | 2/1979 | Fukatani | 192/111 A |

Primary Examiner—Lawrence J. Staab
Attorney, Agent, or Firm—Oblon, Fisher, Spivak, McClelland & Maier

[57] ABSTRACT

A clutch releasing device for positively releasing a disc assembly from a flywheel and for providing a predetermined value of a distance between an engagement surface of the flywheel and a friction surface of the disc assembly, comprises a cylindrical member disposed between the disc assembly and an antifriction bearing supported on the drive shaft and the flywheel, and an annular resilient member disposed between the cylindrical member and the clutch hub.

7 Claims, 6 Drawing Figures

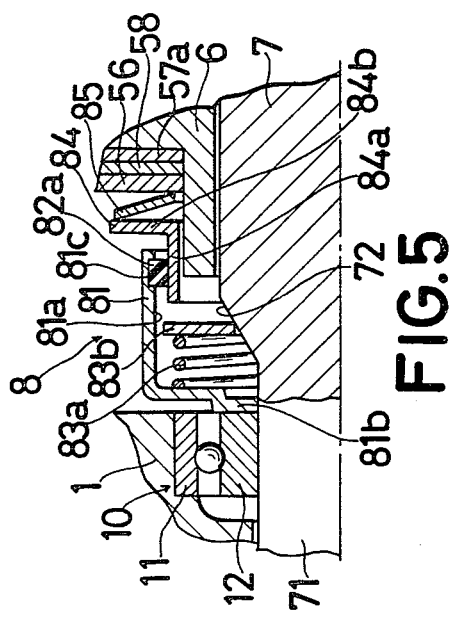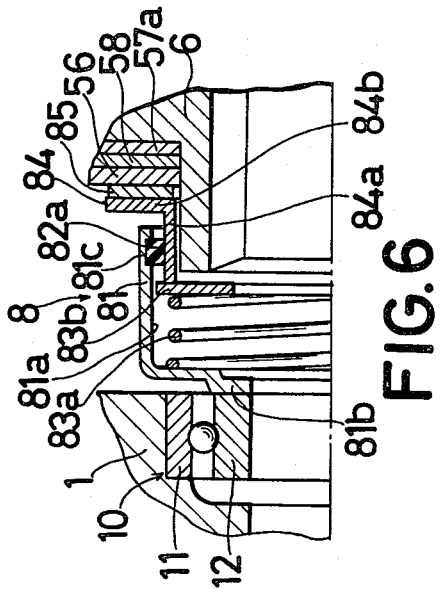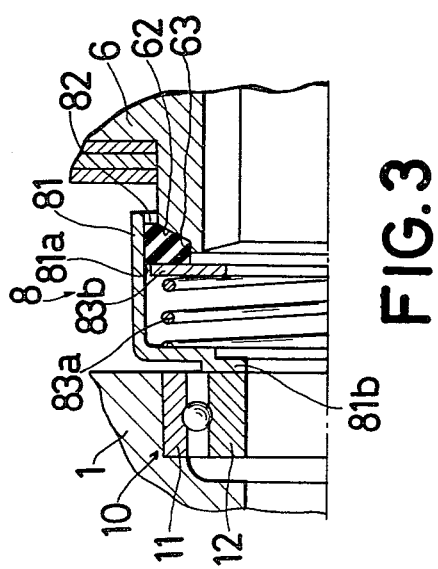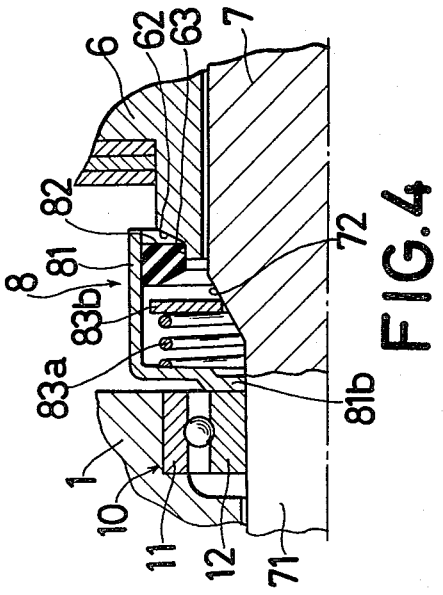

CLUTCH RELEASING DEVICE

BACKGROUND OF THE INVENTION

1. Field of the Invention

The present invention relates to clutch releasing devices for clutch assemblies adapted for use on automotive vehicles, and more porticularly to clutch releasing device for positively releasing a disc assembly from a flywheel attached to a crank shaft of the internal combustion engine of the vehicles.

2. Description of the Prior Art

U.S. Pat. No. 3,700,084, for instance granted on Oct. 24, 1972 to Nasu et al teaches clutch releasing devices incorporated into clutch assemblies comprising two cylindrical members positioned inbetween a disc assembly and an inner race of a guide bearing and an annular resilient member so as to provide the releasing operation to release the disc assembly from the flywheel by the thrust force due to the elastical deformation of the annular resilient member.

According to such conventional types, the driven shaft is inserted into the clutch hub at the final stage of assembling. When the driven shaft is inserted with phase difference between the inner spline teeth formed on the inner periphery of the clutch hub and the outer spline teeth formed on the driven shaft, the clutch hub is moved toward the guide bearing. Accordingly, the frictional engagement of the annular resilient member with the cylindrical member is brought away to the guide bearing with the results that clutch releasing devices will lose the function thereof and be out of practical use.

SUMMARY OF THE INVENTION

It is a principal object of the present invention to provide clutch releasing device wherein the difficulties of the conventional clutch releasing device may be resolved.

It is another object of the present invention to provide clutch releasing device for positively releasing the disc assembly from the flywheel wherein the distance between the engagement surface of the flywheel and the frictional surface of the disc facing member is automatically adjusted by a predetermined value in accordance with the wear on the disc facing member.

It is still another object of the present invention to provide clutch releasing device which is simple in construction, low in cost, and reliable in operation.

The invention, both as to its organization and method of operation, together with further objects and advantages thereof may best be understood by reference to the following description taken in connection with the accompanying drawings wherein like parts in each of the several figures are identified by the same reference character.

BRIEF DESCRIPTION OF THE DRAWINGS

In the drawings:

FIG. 3 is an enlarged sectional view of the clutch releasing device of FIG. 1 keep before inserting of the driven shaft;

FIG. 4 is an enlarged sectional view of the clutch releasing device of FIG. 1 in clutch disengagement;

FIG. 5 is a enlarged sectional view of a second embodiment of the clutch releasing device according to the present invention keep in clutch disengagement; and FIG. 6 is an enlarged sectional view of the clutch releasing device of FIG. 5 in clutch engagement.

DETAILED DESCRIPTION OF THE INVENTION

Referring now to FIGS. 1-4 of the accompanying drawings, a first embodiment of the clutch releasing device according to the present invention will be described hereinbelow in detail.

Figure 1:
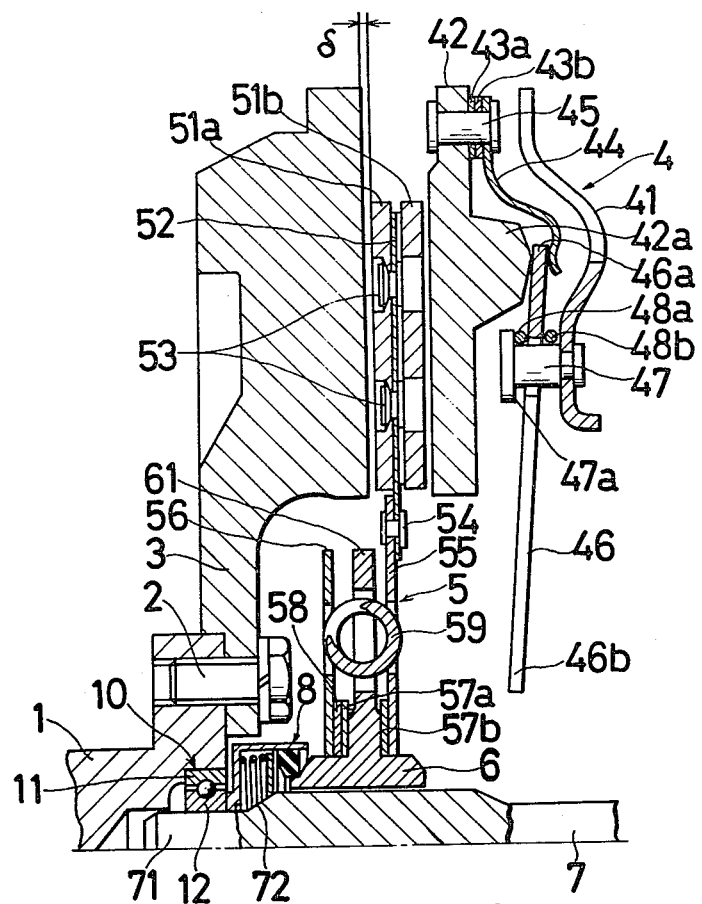
FIG. 1 is a half as much as an axial sectional view of a clutch assembly incorporating a first embodiment of the clutch releasing device according to the present invention wherein the clutch assembly is seen in its released condition.

In FIG. 1, the numeral 1 represents only partially a drive shaft such as a crankshaft of the internal combustion engine of the automotive vehicle, inner end portin of the drive shaft being securely supported on an outer race 11 of an antifriction bearing 10. A flywheel 3, only partially shown, is concentrically and fixedly attached to the drive shaft 1 by means of a plurality of fixing bolts only one of which is shown representatively at 2.

Numeral 4 represents schematically and only partially a conventional clutch cover assembly comprising a clutch cover 41, a pressure plate 42, and a diaphragm spring 46. The clutch cover 41 is concentrically and fixedly attached to the flywheel 3 by means of a plurality of fixing bolts, not shown. The pressure plate 42 in concentrically supported on the clutch cover 41 through a plurality pair of driving straps only one pair of which is shown representatively at 43a and 43b. One end of the driving straps 43a and 43b is fixedly attached to the outer periphery of the clutch cover 41 by means of a rivet member, not shown. The other end the driving straps 43a and 43b, together with a retracting spring 44, is fixedly attached to the outer periphery of the pressure plate 42 by means of a rivet member 45. The diaphragm spring 46, is mounted on the clutch cover 41 by means of a plurality of rivet members only one of which is shown representatively at 47, and is held between a ring-shaped projection 42a of the pressure plate 42 and the retracting spring 44 in peripheral ring part 46a of the diaphragm spring 46.

A first pivot ring 48a is inserted between an enlarged head 47a of the rivet member 47 and diaphragm spring 46. In the similar way, a second pivot ring 48b is also inserted between the diaphragm spring 46 and clutch cover 41. Resilient force of the diaphragm spring 46 normally biases the pressure plate 42 toward the flywheel 3. When the radially extending arms 46b of the diaphragm spring 46 are subjected to an axial pressure by release bearing, not shown, in clutch releas operation, the pressure plate 42 is carried back toward the clutch cover 41 as shown in FIG. 1.

Numeral 5 represents schematically and only partially a well-known disc assembly comprising a disc facing member 51a provided at the flywheel side, a disc facing member 51b provided at the pressure plate side, and a clutch hub 6, the disc assembly 5 being normally squeezed between the flywheel 3 and the pressure plate 42 for transmitting drive power transmitted from the drive shaft 1 to a conventional changing gear apparatus or other means, not shown, through a driven shaft 7. The disc facing mebmers 51a and 51b are fixedly attached to the respective sides of a disc spring 52 by means of a plurality of rixing rivets 53. The inner periphery of the disc spring 52 is fixedly attached to a main drive plate 55 mounted at one side of a flange 61 extended on the navel portion of the clutch hub 6 by means of plurality of fixing rivets 54. An auxiliary drive plate 56 mounted at the other side of the flange 61 is interconnected to the main drive plate 55 by means of rivet, not shown. Each of the plates 55 and 56 may be rotated with respect to the flange 61 through a damper 59. A first friction plate 57a is squeezed between the inner periphery of the flange 61 and a spring plate 58 interposed between the auxiliary drive plate 56 and the flange 61. In the similar way, a second friction plate 57b is squeezed between the inner periphery of the flange 61 and the inner periphery of the main drive plate 55. The clutch hub 6 is axially slidably mounted on the driven shaft 7 through the spline coupling formed thereon. An end portion 71 of the driven shaft 7 is somewhat loosely inserted into an inner race 12 of the bearing 10. Therefore, the driven shaft 7 is concentrically and rotatably mounted on the drive shaft 1 through the bearing 10.

Figure 2:
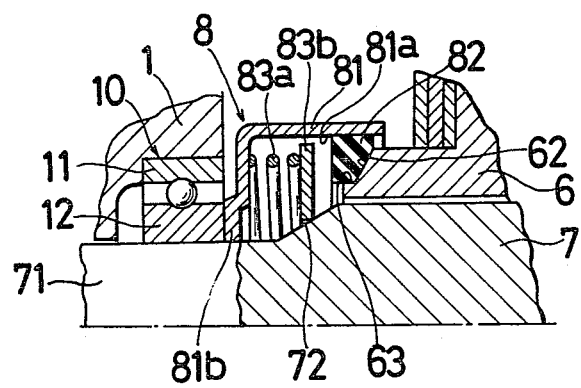
FIG. 2 is an enlarged sectional view of the clutch releasing device of FIG. 1 in clutch engagement.

Numeral 8 represents only partially a clutch releasing device, in accordance with the present invention, disposed between the disc assembly 5 and the inner race 12 of the bearing 10. In FIG. 2–FIG. 4, a cylindrical member 81 supported concentrically to the driven shaft 7 is formed with a cylindrical portion 81a and a reduced portion 81b kept in contact with the inner race 12, and is supported on the end portion 71. An annular resilient member 82 made of rubber is securely mounted on a sleeve portion 63 extending from the left-hand side of the clutch hub 6, and is elastically and frictionally inserted into the inner circumferential wall of the cylindrical portion 81a. The resilient member 82 positively releases the disc assembly 5 from the flywheel 3 upon clutch disengagement as shown in FIG. 1 to provide a predetermined value of a distance, δ between the engagement surface of the flywheel 3 and the frictional surface of the disc facing member 51a. A ring shaped plate member 83b arranged within the cylindrical portion 81a is biased to move right by urging force of a spring member 83a inserted between the reduced portion 81b and the plate member 83b. The plate member 83b engages with a tapered cylindrical portion 72 of the driven shaft 7 in the condition illustrated in FIGS. 2 and 4. Before the driven shaft 7 is inserted into the inner race 12 and the clutch hub 6, as shown in FIG. 3 upon clutch assembled condition, the ring shaped plate member 83b abuts on the left side of the annular resilient member 82 which is slidingly thrusted to the right against the frictional resistance on the inner circumferential wall of the cylindrical portion 81a by urging force of the spring member 83a. Therefore, the annular resilient member 82 is elastically deformed to contact with a conical stopping portion 62 formed on the clutch hub 6, and will store the thrust force for providing the predetermined value of the distance indicated by δ in FIG. 1.

In the assembled condition of the device 8 as shown in FIG. 3, when the driven shaft 7 is to insert with phase difference between the inner spline teeth formed on the inner periphery of the clutch hub 6 and the outer spline teeth formed on the driven shaft 7, the clutch hub 6 is pressed toward the bearing 10 by the driven shaft 7 through the spline couples. Therefore, the clutch hub 6 is moved toward the bearing 10 with the elastical bending of the main drive plate 55, the disc spring 52 and so on. It is to be noted that during movement of the hub 6, the facing members 51a and 51b are squeezed between the flywheel 3 and the pressure plate 42 upon clutch assembling. Accordingly, the plate member 83b and the annular resilient member 82 are pressed to the left against urging force of the spring member 83a and the frictional resistance between the resilient member 82 and the cylindrical member 81 so that the annular resilient member 82 is moved left relative to the cylindrical member 81 and the frictional and elastical engagement position between the annular resilient member 82 and the cylindrical member 81 is moved left compared with the position as shown in FIG. 3.

In the condition described above, the driven shaft 7 my not be inserted into the inner race 12 and the clutch hub 6. When the thrust force for pushing the driven shaft 7 to the bearing 10 is removed, the plate member 83b presses the annular resilient member 82 toward the clutch hub 6 with the urging force of the spring member 83 against the frictional resistace between the cylindrical member 81 and the resilient member 82, while the disk assembly is restored to the original state due to the elasticity thereof. Therefore, the clutch hub 6 is moved toward the right direction, while the annular resilient member 82 is moved right with respect to the cylindrical portion 81a, and the engagement position between the annular resilient member 82 and the cylindrical portion 81a is restored to the position as shown in FIG. 3.

Then, the driven shaft 7 is adjusted to fit the inner spline teeth of the clutch hub 6 with the outer spline teeth of the driven shaft 7, and is inserted into the clutch hub 6. Thus, the plate member 83b is moved in the left direction by engagement with the tapered cylindrical portion 72 and is left away from the annular resilient member 82 as shown in FIG. 2. The annular resilient member 82 is kept pressed on the conical stopping 62 by the frictional resistance between the cylindrical portion 81a and the annular resilient member 82, thereby storing the thrust force for pushing the clutch hub 6 to the ringt.

While the clutch is in engagement or just before disengagement, the releasing device 8 is in the condition as illustrated in FIG. 2 which will be called a first operational condition. When the clutch pedal is depressed, the facing members 51a and 51b are released from the flywheel 3 and the pressure plate 42. As a result, the clutch hub 6 is positively moved right by the through force of the annular resilient member 82. So that the annular resilient member 82 is restored to the position as illustrated in FIG. 4 which will be called a second operational condition of the releasing device 8. Consequently, the distance δ between the disc facing member 51a and the flywheel 3 is kept at the predetermined value, even if the distance δ becomes lager than the predetermined value due to the wear of the frictional surface of the disc facing member 51a, because the contact position between the resilient member 82 and the cylindrical portion 81 is moved left in accordance with the wear of the facing member 51a and the deformation of the resilient member 82 is constant to produce a constant resilient force to the clutch hub 6.

Next, referring to FIG. 5–FIG. 6 the second embodiment of the clutch releasing device according to the prescent invention will now be described. The same reference numerals are used to describe similar elements for this second embodiment as those described and shown in the first embodiment of FIG. 2–FIG. 4.

A cylindrical member 81 concentrically supported on an end portion 71 of a driven shaft 7 is formed with a cylindrival portion 81a and reduced portion 81b kept in contact with the right-hand side of the inner race 12 of the bearing 10. A first annular resilient member 82a made of rubber is securely supported into an annular groove 81c provided on the inner circumferential wall of the cylindrical portion 81a. A flanged cylindrical member 84 interposed between an auxiliary drive plate 56 and the cylindrical member 81 is formed with a cylindrical portion 84a located in the inner cavity of the cylindrical portion 81a and with a flange portion 84b extended on the cylindrical portion 84a, and is supported elastically in the inner circumferential wall fo the first annular resilient member 82a. The flanged cylindrical member 84 will be moved left on the resilient member 82a when the thrust force gets larger than the frictional resistance between the members 82a and 84. A second annular resilient member 85 such as a dish-spring, a wave-spring, a rubber-spring and the like is interposed between the inner peripheral portion of the auxiliary drive plate 56 and the flange portion 84a of the flanged cylindrical member 84 for providing the spring force for releasing the disc assembly 5 from the flywheel 3 and for producing a predetermined value of the distance δ between the engagement surface of the flywheel 3 and the frictional surface of the disc facing member 51a. When the driven shaft 7 is inserted as shown in FIG. 5 upon clutch released condition, a ring shaped plate member 83b arranged within the cylindrical portion 81a is thrusted to the left against exerting force of a spring member 83a inserted between the reduced portion 81b and the plate member 83b. Therefore, the flanged cylindrical member 84 is elastically and frictionally supported only by the first annular resilient member 82a. Before the driven shaft 7 is inserted as shown in FIG. 6, in clutch assembled condition, the ring shaped plate member 83b is, due to the force of the spring 83a, in contact with cylindrical portion 84a against the urging force of the second annular resilient member 85 and the frictional resistance between the cylindrical portion 84a and the first annular resilient member 82a. Accordingly, the second annular resilient member 85 is squeezed between the auxiliary drive plate 56 and the flange portion 84b, thereby keeping the thrust force for pushing the disk assembly 5 away from the flywheel 3. When the clutch assembly is brought to engagement condition the disk assembly 5 is pressed onto the flywheel 3 against the force of the second annular resilient member 85 and the frictional resistance of the spline couple between the clutch hub 6 and the driven shaft 7. The flanged cylindrical member 84 will be moved left with respect to the cylindrical portion 81a if the disk assembly 5 is further pressed in the left direction against the frictional resistance between the members 82a and 84. Thus, the annular resilient means of the second embodiment comprises the first annular resilient member 82a for mainly providing frictional resistance and the second annular resilient member 85 for mainly providing elastical deformation.

The operation of the second embodiment is obviously understood from the previous description without detailed explanation thereof.

Various modification and alterations of the present invention will became apparent to those skilled in the art without departing form the scope and spirit of the present invention, and it should be understood that the present invention is not to be unduly limited to illustrative embodiment set forth herein.

We claim:

1. In a clutch assembly having a driving member, a driven member mounted on said driving member through a bearing means, a disc assembly having a hub drivingly and axially slidable mounted on said driven member,
   a clutch releasing device comprising a cylindrical member interposed between said hub of disc assembly and said bearing means,
   a resilient means operatively connected to said hub and said cylindrical member for positively urging said disc assembly in one direction wherein said disc assembly is released from said driving member, and
   a spring means interposed between said bearing and said resilient means for normally urging said resilient means in said one direction.

2. A clutch releasing device according to claim 1 wherein said spring means comprises a ring shaped plate member which may abut on said resilient means.

3. A clutch releasing device according to claim 2 wherein said resilient means is securely mounted on a sleeve portion extending from said hub.

4. A clutch releasing device according to claim 2 wherein said resilient means comprising a first annular resilient member for mainly providing frictional resistance, a second annular resilient member for mainly providing elastical deformation, and a flanged cylindrical member interposed between said first and second annular resilient members.

5. A clutch releasing device according to claim 2 wherein said driven member comprises a tapered cylindrical portion for engaging with said ring shaped plate member.

6. A clutch releasing device according to claim 3 wherein said resilient means is elastically and frictionally inserted in an inner circumferential wall of said cylindrical member, and said spring means is located in an inner cavity of said cylindrical member.

7. A clutch releasing device according to claim 4 wherein said first resilient member and said spring means are located in an inner cavity of said cylindrical member, and said second resilient member is mounted on said hub.

* * * * *